S. Wilcox, Jr.,

Air Engine.

No. 1,942. Reissued Apr. 25, 1865.

Witnesses:
Kimble W. Stetson
D. W. Stetson

Inventor:
Stephen Wilcox jr

UNITED STATES PATENT OFFICE.

STEPHEN WILCOX, JR., OF WESTERLY, RHODE ISLAND.

IMPROVEMENT IN HOT-AIR ENGINES.

Specification forming part of Letters Patent No. 30,701, dated November 20, 1860; Reissue No. 1,942, dated April 25, 1865.

*To all whom it may concern:*

Be it known that I, STEPHEN WILCOX, Jr., of Westerly, in the county of Washington and State of Rhode Island, have invented certain new and useful Improvements in Air-Engines; and I do hereby declare that the following is a full, clear, and exact description of the same, reference being had to the accompanying drawings, in which—

Figure 1:
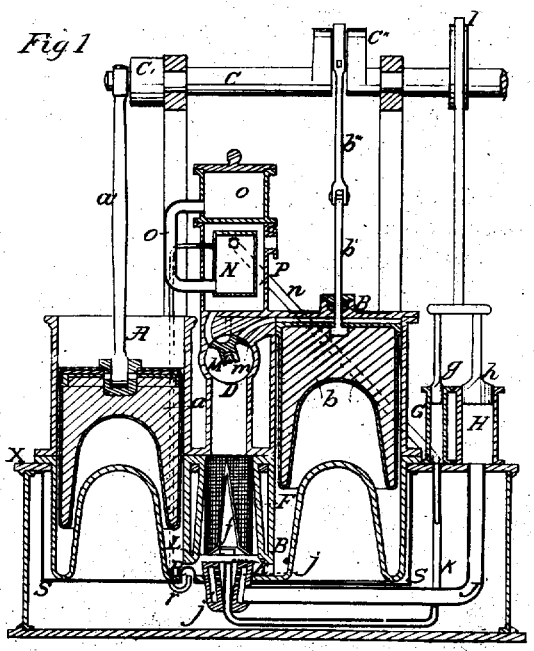
Figure 3:
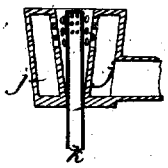
Figure 2:
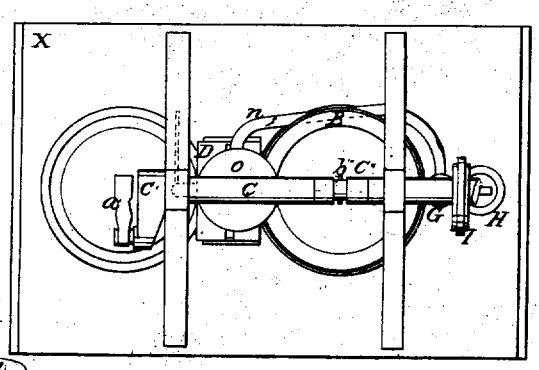

Figure 1 is a vertical section on the line S S in Fig. 2. Fig. 2 is a plan of my improved engine, and Fig. 3 is a section of a portion on a larger scale.

Similar letters of reference indicate like parts in all the figures.

My invention relates to that class of engines which use as the motive power to propel the piston the expansive force of the gaseous compounds resulting from combustion within the cylinder. The heat applied in this manner is, for obvious reasons, more efficient than when applied to the exterior of the cylinders. Many efforts have been heretofore made to apply the heat of combustion directly to the gases in the cylinder, or, in other words, to use the gaseous products of combustion in a cylinder as a means of obtaining power; but when coal or other solid fuel is employed in this way small particles of ashes and of unburned fuel are liable to adhere to the rubbing surfaces of the piston, cylinder, and valves, and cause them to abrade and destroy each other. Combustible gas may, however, be burned in such situations without involving this evil. The combustion of hydrogen or of carbureted hydrogen in the proper amount of atmospheric air produces a very intense heat and corresponding expansive force. Attempts have been made to utilize the power thus produced by mixing the gases in given quantities within the cylinder and then exploding the mixture. The forms of engines used in these cases, though they have been successful in developing considerable power, have failed to become of practical utility from the fact that the concussions resulting from the sudden explosions have been too violent. Other difficulties have also presented themselves in practice, such as the overheating the cylinder and piston, the uncertainty of igniting the mixture, and the difficulty of controlling the power when generated.

My improved engine is intended to overcome or avoid all these practical difficulties, and to render the combustion of gas within the cylinder a practical and efficient source of power.

The nature of my invention consists, first, in the application and use of a regenerator, in combination with an air-engine in which the power is produced by the direct action of the products of combustion within the cylinder; second, in supplying the gas used for fuel in such engines in the proper quantity for each stroke gradually as it is consumed, by means of a pump operated by the engine; third, in combining a quantity of cooler air with the products of combustion, for the purpose of preserving a proper degree of heat within the cylinder, as hereinafter described; fourth, in the use of a certain valve for the purpose of preventing the reflux of heated air into the cold end of the changing cylinder; fifth, in an arrangement of an evaporator for supplying the gas for the engine, so that the amount of vaporating-surface shall be automatically regulated to the quantity consumed; sixth, in placing a substance capable of resisting great heat in such a position relatively to the burner that the heat from the latter shall cause it to become heated and serve the purpose of an igniter to subsequent charges; seventh, in the employment of an additional outside casing arranged to envelop both the mixing or combustion chamber and the working-cylinder, as shown, so as to effectually check the leakage and radiation; eighth, in arrangements for applying diluted and cooled products of combustion on the under side of a vertically-working and lightly-protected piston, in order that the parts may endure better than heretofore and the engine be run more rapidly.

To enable others skilled in the art to make and use my invention, I will proceed to describe its construction and operation, by the aid of the drawings and of the letters of reference marked thereon.

A is the working-cylinder, and *a* the working-piston; B, the changing and pumping cylinder, and *b* its piston; E, the regenerator-chamber; F, the regenerator; D, the valve-chest; M, the valve therein; C, the shaft; C′ and C″, cranks thereon. These parts are similar in construction, arranged relatively to each other, operate together, and are operated the same as in the patent granted to me May 3, 1859, No. 23,876, and therefore it is not necessary to particularly describe them herein.

Upon the bed-plate X, I affix a pump, G, having a piston, *g*, operated by an eccentric, I, upon the shaft C. This pump is made of the proper capacity to supply just the quantity of gas that is required at each stroke of the engine. It draws its supply from a reservoir, N, or direct from the mains in the street, where gas can be obtained ready-made.

K is a pipe leading from the pump to the burner within the chamber E.

By the side of G, I place another pump, H, operated by the same eccentric. This pump supplies the air required for the combustion of the gas, and is enough larger than G to furnish it in the right proportion. It draws its supply from the atmosphere, and has a pipe, J, leading to the burner. This burner is situated within the chamber E, and is constructed as follows: The pipe K terminates in a perforated nozzle, *k*, as more clearly shown in Fig. 3. Around *k* is an annular chamber, *j*, into which the air from H is conveyed by J. The interior of this chamber is also pierced with holes, as represented, and the aggregate area of these holes bears the same proportion to the area of the holes in K as the area of their respective pumps H and G. By this means the gas and air are intimately mixed in the proper proportions for producing perfect combustion immediately at the point of burning without any liability of the flame extending back into the pump and causing an explosion.

R is the igniter, of any suitable character. It may be a plate or coil of metal heated by electricity; or it may be a hollow shell of metal in the form of a thimble, kept at a proper degree of heat by a jet of gas supplied by the pipe *r*, or by a blow-pipe flame extending into its exterior. A piece of fire brick or asbestus, L, is placed immediately over the burner, and soon becomes so hot as to serve the purpose of an igniter, and requires no extra jet of gas to keep up its temperature.

To the valve M, I hinge a supplementary valve, *m*, as shown, so arranged that it will allow of air passing from the top of B to the bottom, but will not allow of any passing in the opposite direction. The object of this valve will be more fully explained below.

In places where gas cannot be obtained ready-made, I employ the following means of producing it by the heat of the exhaust: Upon the valve chest, or in any other suitable position, I mount a vessel, P, so arranged that the exhaust air from the engine must pass through it. Within this vessel I place another one, N, which I denominate an "evaporator." This vessel has two openings, one at the top, connecting with the pump G by the pipe N, the other at the bottom, communicating with a reservoir, O, placed at a higher elevation, by the pipe *o*. The reservoir O should be provided with a regulating or safety valve or with some equivalent vent, as it is liable under certain circumstances to become too highly heated. The reservoir being filled with any proper hydrocarbon fluid—as rosin-oil or camphene—a portion flows into N, where it is evaporated by the heat and forms a gas. As the quantity of gas increases in N, it forces back a portion of the fluid, thus reducing the surface exposed to the heat and necessarily the quantity evaporated. As the gas is drawn from N by the pump G the fluid flows in and the evaporating-surface is increased. In this manner the supply of gas is regulated by its consumption. A float in N, operating on a cock in *o*, (not represented,) or any other convenient method, may be employed to prevent the fluid in N rising to a height sufficient to overflow into the pipe *n*, and thence into the pump G.

To prevent leakage and loss of heat the parts of the engine subjected to a high heat are surrounded by a wrought-iron jacket, S, a little larger on all sides than the cast-iron cylinders, and the space between the two is filled with plaster or any good non-conductor. This prevents the radiating of heat, and consequently economizes gas. The tight jacket also prevents any leakage, though the cylinder may be porous or cracked.

The operation is as follows: If there is no gas in the reservoir N, a lamp is lighted beneath it to generate sufficient for starting. The jet within the igniter R is also lighted, and R soon becomes heated to a bright-red heat. Upon the descent of *b*, the valve M being so placed as to connect the cylinder-port and induction-port, (shown in dotted lines in Fig. 1,) a quantity of cold air is taken in from the atmosphere and fills the space above *b*. The valve M is then changed into the position shown in the drawings, and piston *b* rises, forcing the air over through the regenerator into the space beneath. These motions are all obtained, and the effect produced thereby is the same as explained in the patent of May 3, 1859, above referred to. At the same time that *b* is rising the pistons in the pumps G and H descend, forcing gas and air into the engine through the burner, where they are intimately mixed and ignited by coming in contact with R. In burning they raise the temperature of the inclosed air, thereby greatly increasing its pressure, which forces up the piston *a* and gives motion to the machine. The valve M is now changed and the heated air exhausted through the regenerator F, where it parts with a large portion of its caloric, and through P, and around the evaporator N, where it evaporates the gas for a future stroke. Meantime *b* descends and takes in a fresh supply of air for the next stroke. After a few strokes the interior of the lower portion of the cylinders, the regenerator, and the fire-brick L becomes highly heated, and the igniter R is no longer required. As it is necessary that the top of B should be kept comparatively cold, that a full supply of fresh air may be taken in at each stroke, the heated air must not be allowed to flow back from the hot end, as it tends to do while the gas is burning. To prevent this I make use of the valve *m*, which closes the moment the pressure becomes greater below than above *b*, and prevents the reflux of heated air. By this means I also utilize the power which may arise from an excess of pressure below *b*, as it forces *b* upward and helps to drive the engine.

It will be observed my engine is not driven exclusively by the products of combustion, as in all other engines of this class with which I am acquainted, but that the products of combustion are mingled with a quantity of cooler air supplied from the cylinder B, to which they impart a portion of their heat, and the temperature within the cylinders is thereby kept at a point which the metal can safely bear. It is not necessary that a supply of air should be pumped in with the gas, as it may draw its oxygen from the air within the engine; but a more perfect combustion is thereby insured, particularly before the engine becomes heated up to its working-temperature. When so heated, the temperature is sufficient to produce combustion, and all the gas introduced must be burned, provided any oxygen is present.

The advantages due to my improved engine are—

First. By the use of the regenerator, in combination with producing the heat by combustion within the cylinder, (a combination never before used, to my knowledge,) I am not only enabled to obtain the usual advantage of saving in fuel due to the regenerator, but by the heat thereby imparted to the incoming air I am enabled to produce a more perfect combustion within the cylinder than could be obtained by cold air, and thereby an increased amount of heat from the fuel which is burned. I am also enabled to keep the valve M at such a temperature that it will work to advantage, whereas in all the engines hitherto known to me in which the products of combustion were used the exhaust-valve has occasioned great difficulty by its becoming highly heated in a short time.

Second. By supplying the combustible gas gradually as it is burned all explosions are avoided, and the consequent wear and tear upon the engine saved.

Third. By combining a quantity of cooler air with the products of combustion the temperature of the engine is kept at a safe point, and a larger amount of practical effect obtained from the heat generated.

Fourth. By means of the supplemental valve *m* the hot air is prevented from being forced into the top of the changing cylinder, whereby it is kept cool, and an amount of power gained by the direct action of the air upon the working-piston.

Fifth. By the arrangement of the evaporator the supply of gas is regulated by the amount consumed, and only a small quantity can at any time be generated. It also insures a nearly equal pressure upon the gas, and consequently a regular supply to the engine. This would not be the case were the gas to increase in pressure, like steam in a steam-boiler, if it should be generated faster than it was used.

Sixth. By means of the fire-brick or asbestus L immediately above the burner the heat generated by one stroke ignites the gas of the next, and the igniter is thereby dispensed with, except in starting.

Seventh. By inclosing both the chamber B, in which the combustion is effected, and the working-cylinder A in a casing or jacket, S, common to both, the efficiency and durability of the machine is promoted, even if the space between the jacket and the interior casings is filled simply with air. It effects this by checking the leakage through any joint or crack, and tends very materially to retard the escape of heat. It effects both these ends still better if filled with plaster or the like, as described.

Eighth. By my upright arrangement, with the provisions for cooling the products of combustion before their admission to the working-cylinder, I preserve the parts from overheating without making the piston very heavy or exposing the rubbing surfaces to grit. The valves are exposed only to such a moderate heat, due to the mixture or dilution, that they can endure well. The gas in the thin annular space extending down below the packing becomes further cooled by imparting its heat to the metal, and remains and is carried up and down without circulation, and the material below is so moderately heated that my engine may be stopped suddenly when at full heat without danger of injuring the packing.

It will be understood that if the mixed or diluted products were applied above a corresponding piston, as in Sir George Cayley's engine of 1837, grit entering the cylinder would descend upon the packing and cut the cylinder, while if the products were admitted uncooled, as in B. F. Craig's engine of 1860, and a later dilution relied on to suppress the temperature, it would intensely heat the solid matter below and tend to destroy the valve-surfaces, and in case such an engine should be stopped suddenly it would overheat the packing by radiation from the hot parts below; and if the engine were in an inclined or horizontal position, well-cooled gases would not collect next to the packing and remain there, but the hotter mixture of gases would circulate by flowing toward the packing at the top and away from the packing at the bottom. My arrangement avoids these evils, makes my engine durable, and allows it to operate successfully with but slight protection for the piston, and to be run rapidly.

Having now fully described my invention, what I claim as new therein, and desire to secure by Letters Patent, is—

1. In combination with an air-engine in which the air and gases are heated by combustion within the cylinder, or in a chamber leading thereto, the use of a regenerator, F, substantially as and for the purposes herein described.

2. Gradually supplying the combustible gas or vapor for a gas-engine, operating substantially as herein described, as it is consumed and in the proper quantity for each stroke by means of the pump G, or its equivalent, for the purpose set forth.

3. Combining a quantity of cooler air with the products of combustion by the combined action of piston *b* and valve M, or their equivalent, substantially as described, for the purpose of preserving a safe degree of heat within the cylinders, as above set forth.

4. The supplemental valve *m*, arranged and operating substantially as and for the purpose herein specified.

5. The arrangement of the heated evaporator N and cooler reservoir O, in combination with an engine operating with the direct pressure of the products of combustion, with or without the pump G, substantially in the manner and for the purpose herein set forth.

6. Placing a piece of fire-brick, L, or equivalent substance, in close proximity to the burner *j k*, for the purpose above specified.

7. In an engine operated with the direct pressure of the products of combustion, and having the working cylinder and the combustion-chamber arranged upon a single portable base, X, the arrangement of the furnace-casing and the working-cylinder in the additional casing S, common to both, with air or other non-conducting substance filling the intervening space, substantially as and for the purpose herein set forth.

8. In such engines, in combination with the provisions for reducing the temperature of the products of combustion before their admission to the cylinder, as shown, the employment of the thick non-conducting piston *a*, working in a vertical cylinder, and having its packing widely removed at all times from the heated parts of the apparatus, all arranged substantially as and for the purpose herein set forth.

In testimony whereof I have hereunto set my hand in the presence of two subscribing witnesses.

STEPHEN WILCOX, JR.

Witnesses:

KIMBALL W. STETSON,

D. W. STETSON.